US 12,069,752 B2

United States Patent
Patenaude et al.

(10) Patent No.: US 12,069,752 B2
(45) Date of Patent: Aug. 20, 2024

(54) VEHICLE COMMUNICATION SYSTEM WITH ALTERNATIVE PERIODIC CONNECTIVITY MODE

(71) Applicant: GM GLOBAL TECHNOLOGY OPERATIONS LLC, Detroit, MI (US)

(72) Inventors: Russell A. Patenaude, Macomb Township, MI (US); Matthew E. Gilbert-Eyres, Rochester, MI (US); Eric T. Hosey, Royal Oak, MI (US); Matthew Neely, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 365 days.

(21) Appl. No.: 17/719,474

(22) Filed: Apr. 13, 2022

(65) Prior Publication Data
US 2023/0337296 A1    Oct. 19, 2023

(51) Int. Cl.
*H04W 76/11* (2018.01)
*H04W 4/40* (2018.01)
*H04W 4/50* (2018.01)

(52) U.S. Cl.
CPC .............. *H04W 76/11* (2018.02); *H04W 4/40* (2018.02); *H04W 4/50* (2018.02)

(58) Field of Classification Search
CPC ......... H04W 76/11; H04W 4/40; H04W 4/50; H04W 16/18; H04W 48/16; H04W 48/20; H04L 67/12; H04L 67/62
See application file for complete search history.

(56) References Cited

U.S. PATENT DOCUMENTS

2019/0246435 A1*  8/2019  Hummel ............. G06F 3/04847

* cited by examiner

*Primary Examiner* — Steven Hieu D Nguyen
(74) *Attorney, Agent, or Firm* — Quinn IP Law

(57) ABSTRACT

A communication system for a vehicle includes a controller adapted to selectively execute an alternative periodic connectivity mode for communication between a user of the vehicle and a remote assistance unit. The vehicle is not connected to a wireless plan. The controller has a processor and tangible, non-transitory memory on which instructions are recorded. The alternative periodic connectivity mode is activated based in part on at least one automatic trigger and/or a request from the user. The controller is adapted to assign a distinct identifier to the vehicle during execution of the alternative periodic connectivity mode. The distinct identifier is defined by a plurality of parameters, including a connection time interval, an internet protocol address range and a host port. The internet protocol address range and the host port may be dynamically configured to remain disengaged unless given a system clearance.

20 Claims, 2 Drawing Sheets

VEHICLE COMMUNICATION SYSTEM WITH ALTERNATIVE PERIODIC CONNECTIVITY MODE

INTRODUCTION

The present disclosure relates generally to a communication system for a vehicle. More specifically, the disclosure relates to a communication system having an alternative periodic connectivity mode for communication between a user of the vehicle and a remote assistance unit. It is an undeniable facet of modern life that many people spend a considerable amount of time in their vehicles, while being transported from one place to another. An occupant of a vehicle who opts out of traditional paid telematic services and packages may require assistance in unexpected situations. The occupant may be a driver or a passenger.

SUMMARY

Disclosed herein is a communication system for a vehicle. The system includes a controller adapted to selectively execute an alternative periodic connectivity mode for communication between a user of the vehicle and a remote assistance unit. The vehicle is not connected to a wireless plan. The controller has a processor and tangible, non-transitory memory on which instructions are recorded. The alternative periodic connectivity mode is activated based in part on at least one automatic trigger and/or a request from the user. The controller is adapted to assign a distinct identifier to the vehicle during execution of the alternative periodic connectivity mode. The distinct identifier is defined by a plurality of parameters, including a connection time interval, an internet protocol (IP) address range and a host port.

The plurality of parameters may include an access point name range associated with a predetermined carrier. The access point name range is configured to toggle between an OFF mode and an ON mode. The vehicle may have a telematics module, with the plurality of parameters including a station identifier associated uniquely with the telematics module. In other words, each telematics module in the vehicle is associated with a unique station identifier.

In some embodiments, the automatic trigger includes activation of at least one vehicle theft sensor. The automatic trigger may include an internal vehicle diagnostic fault. The automatic trigger may include expiration of a vehicle data credential. The controller may be adapted to selectively configure a new connectivity state for the vehicle, including activating a cellular plan for the vehicle. Configuring the new connectivity state for the vehicle may include changing settings of the at least one automatic trigger.

Disclosed herein is a method of operating a communication system for a vehicle having a controller with a processor and tangible, non-transitory memory on which instructions are recorded. The method includes selectively executing an alternative periodic connectivity mode for communication between a user of the vehicle and a remote assistance unit, via the controller. The vehicle is not connected to a wireless plan. The method includes activating the alternative periodic connectivity mode based in part on at least one automatic trigger and/or a request from the user, via the controller. The method includes assigning a distinct identifier to the vehicle during execution of the alternative periodic connectivity mode, via the controller. The distinct identifier is defined by a plurality of parameters, including a connection time interval, an internet protocol address range and a host port.

The above features and advantages and other features and advantages of the present disclosure are readily apparent from the following detailed description of the best modes for carrying out the disclosure when taken in connection with the accompanying drawings.

Figure 1:
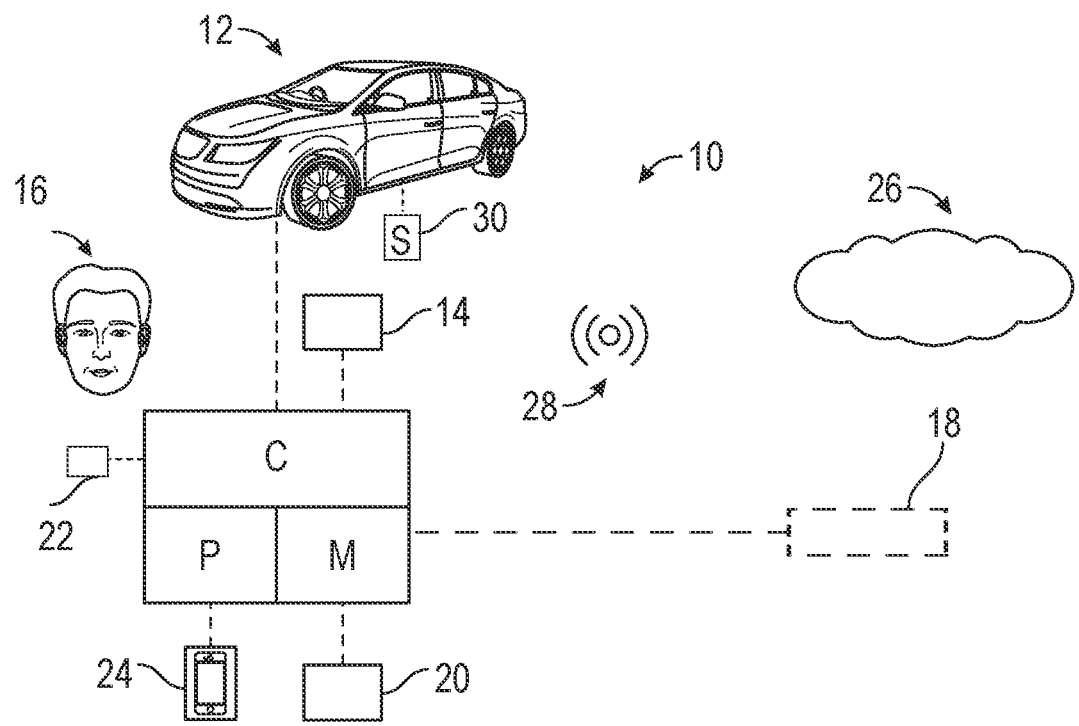
FIG. 1 is a schematic fragmentary diagram of a communication system for a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a communication system 10 for a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

The controller C is adapted to selectively execute an alternative periodic connectivity mode 14 for communication between a user 16 of the vehicle 12 and a remote assistance unit 18. The remote assistance unit 18 may be manned electronically and/or by a remote advisor having access to an electronic device such as a desktop computer, laptop, tablet, cell phone or wearable device. The controller C has at least one processor P and at least one memory M (or non-transitory, tangible computer readable storage medium) on which instructions are recorded for executing a method 100 (described below with respect to FIG. 3). The memory M can store controller-executable instruction sets, and the processor P can execute the controller-executable instruction sets stored in the memory M.

The vehicle 12 is not connected to a wireless plan, such as a telematics plan like OnStar, and may have limited connectivity. The system 10 (via execution of method 100) provides an alternative periodic connectivity mode 14 where the vehicle 12 remains in an "airplane mode." The wireless connectivity may be disabled unless the system 10 determines it needs to make a periodic connection. In some embodiments, the vehicle 12 may have a lapsed or disabled cellular registration. The communication system 10 allows connectivity at a lower cost without a subscription to a wireless/telematic program. This is an advantage for time-sensitive use cases that do not require persistent data connections. Additionally, connectivity is restricted to eliminate perceived location tracking and limit network cellular traffic.

The alternative periodic connectivity mode 14 may be activated based in part on a request from the user 16. Referring to FIG. 1, the alternative periodic connectivity mode 14 may be activated by the user 16 through a communications interface 20 that is accessible to a user or operator of the vehicle 12. The communications interface 20 may include a touchscreen or other IO device and may be incorporated in the dashboard, overhead visor (not shown), or other suitable location in the vehicle 12.

The alternative periodic connectivity mode 14 may be activated based in part on at least one automatic trigger, which may be intermittent or based upon specific events. The automatic trigger may include activation of at least one vehicle sensor, such as a vehicle theft sensor 22. For example, the theft sensor may detect broken window/glass, forced entry and tilt angle of the vehicle 12. The automatic trigger may include data expiration data issue, such as expiration of a credential associated with the vehicle 12. The automatic trigger may be an internal vehicle diagnostic fault where the vehicle 12 has an internal issue that is flagged by an internal diagnostic module (e.g., by monitoring bus signals). For example, the vehicle 12 may have an issue with its power supply/battery requiring service. In some embodiments, the alternative periodic connectivity mode 14 may be activated by the user 16 through a mobile application 24. For example, the mobile application 24 may be physically connected (e.g., wired) to the controller C as part of the vehicle infotainment unit. The mobile application 24 may be embedded in a smart device belonging to a user of the vehicle 12 and/or otherwise linked to the vehicle 12. The circuitry and components of a mobile application 24 ("apps") available to those skilled in the art may be employed.

The controller C may be an integral portion of, or a separate module operatively connected to, other controllers of the vehicle 12. Referring to FIG. 1, the controller C may be configured to communicate with a cloud unit 26. The cloud unit 26 may include one or more servers hosted on the Internet to store, manage, and process data. The cloud unit 26 may be a private or public source of information maintained by an organization, such as for example, a research institute, a company, a university and/or a hospital. In some embodiments, the alternative periodic connectivity mode 14 may be updated via remote updates from the cloud unit 26.

Referring to FIG. 1, the communication system 10 may employ a wireless network 28 for transmissions between the remote assistance unit 18 and the vehicle 12. The wireless network 28 may be a short-range network or a long-range network. The wireless network 28 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The wireless network 28 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 3:
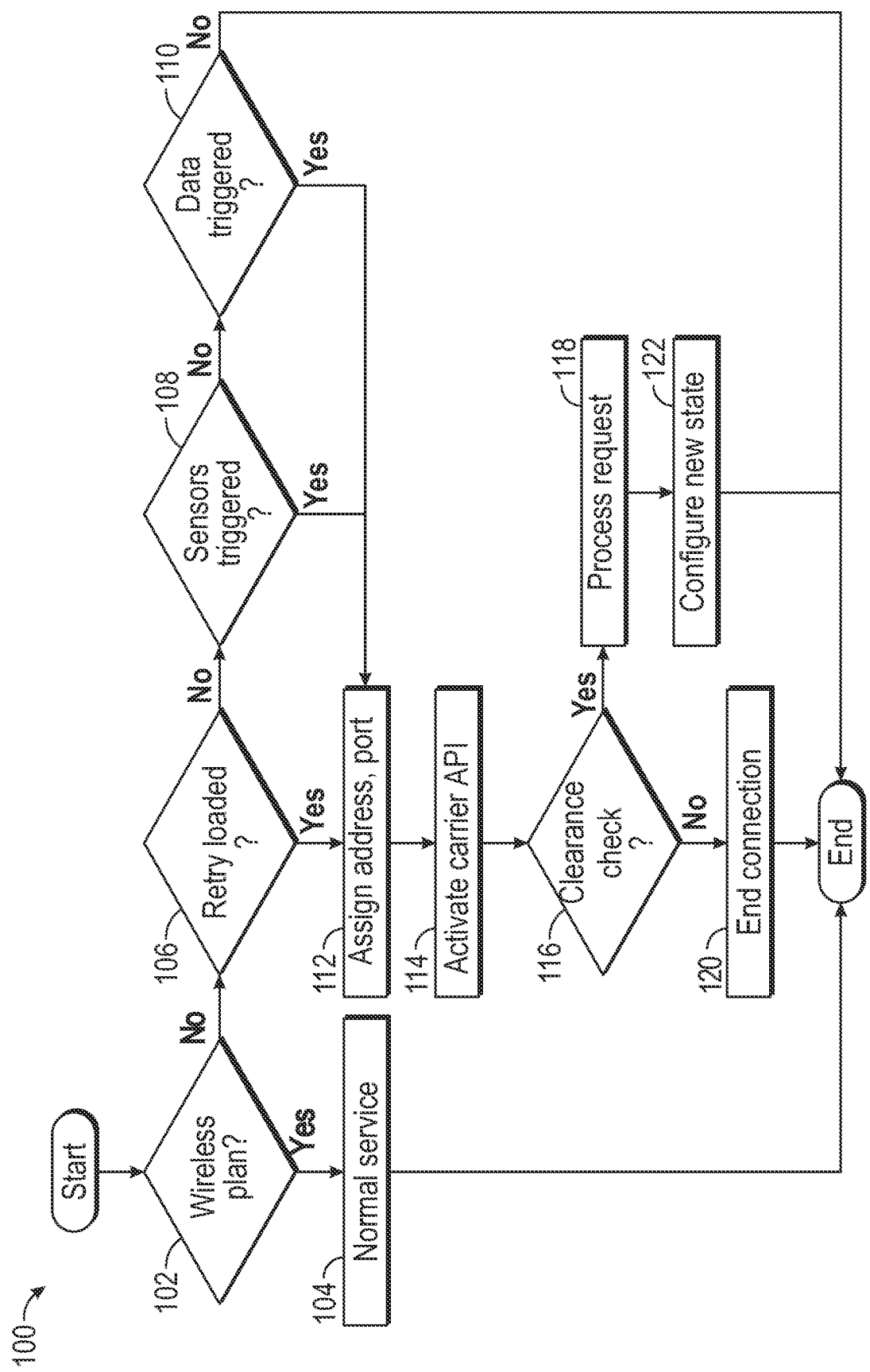
FIG. 3 is a flowchart for a method of operating the communication system of FIG. 1.

Referring now to FIG. 3, a flowchart of a method 100 of operating the alternative periodic connectivity mode 14 is shown. Method 100 need not be applied in the specific order recited herein. Furthermore, it is to be understood that some blocks may be eliminated. In some embodiments, method 100 may be embodied as computer-readable code or stored instructions and may be at least partially executable by the controller C.

Beginning at block 102 of FIG. 3, the controller C is programmed to determine if the vehicle 12 is connected to a wireless plan. If the vehicle 12 is connected to a wireless plan (Block 102=YES), the method 100 proceeds to block 104, where normal service is executed and the method 100 is ended. If the vehicle 12 is not connected to a wireless plan (Block 102=NO), the method 100 proceeds to block 106 of FIG. 3, where the controller C is programmed to determine if the connection retry task has been loaded.

If the connection retry task has not been loaded (Block 106=NO), the method 100 proceeds to block 108. If the connection retry task has been loaded (Block 106=YES), the method 100 proceeds to block 112. Per block 108 of FIG. 3, the controller C is programmed to determine if a vehicle sensor has been triggered. If none of the vehicle sensors have been triggered (Block 108=NO), the method 100 proceeds to block 110 of FIG. 3, where the controller C is programmed to determine if a data expiry issue has been triggered, such as a credential expiring or critical data expiring. The data expiry issue may pertain to a vehicle recall or other software updates. If no data expiry issue has been triggered (Block 110=NO), the method 100 is ended.

Figure 2:
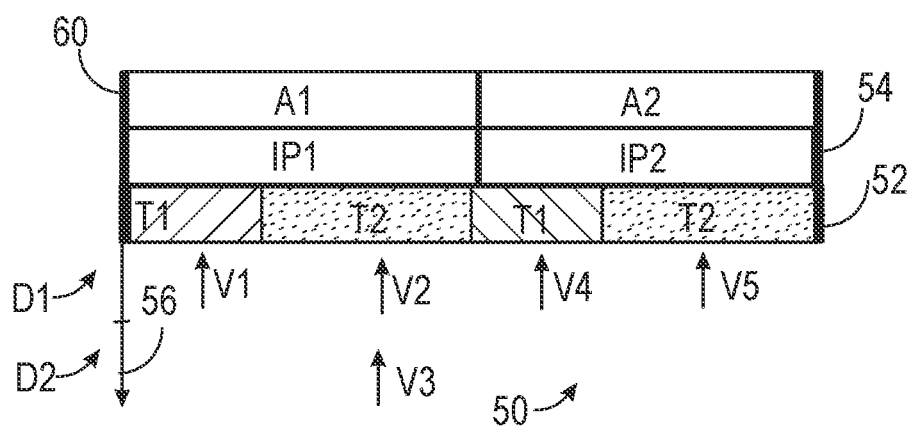
FIG. 2 is a schematic fragmentary diagram of an example identifier layout employable by the system of FIG. 1.

If a data expiry issue has been triggered (Block 110=YES), the method 100 proceeds to block 112. Per block 112 of FIG. 3, the controller C is adapted to assign a distinct identifier (defined by a plurality of parameters) to the vehicle 12. An example identifier layout 50 is shown in FIG. 2. Referring to FIG. 2, the parameters include connection time intervals 52 (e.g., time ranges T1 and T2), internet protocol (IP) address ranges 54 (e.g., ranges IP1 and IP2) and host ports 56 (e.g., ports D1 and D2). Referring to FIG. 1, the parameter may include a station identifier S, which may be a serial number attached to or unique to a telematics module 30 in the vehicle 12. For example, the station identifier S may be a unique code assigned to an OnStar module 30 in the vehicle 12. The station identifier S enables the system 10 to perform a database lookup to identify which vehicle 12 that the account is associated with. Thus, each call from a vehicle 12 comes in with a unique or distinct identifier. The connection time intervals 52, internet protocol (IP) address ranges 54, and host ports 56 may be reconfigured dynamically when new use cases arise.

Advancing to block 114 of FIG. 3, the controller C may be adapted to add an access point name (APN) range 60 (e.g., ranges A1 and A2 shown in FIG. 2) for the vehicle 12. The access point name (APN) ranges 60 may toggle between an OFF mode and an ON mode. The access point name (APN) ranges 60 may be associated with a predetermined carrier, such as Jasper. Jasper is a branch of the networking company Cisco that provides a cloud-based software platform for businesses looking to provide cloud services, without investing large amounts of money to independently develop their own networks. In other words, the controller C may employ a carrier to turn on/off data connections to the vehicle 12.

Referring to FIG. 2, a first vehicle V1 and a second vehicle V2 may call in the same IP range 54 (IP1 in FIG. 2) and APN range 60 (A1 in FIG. 2) but at different time ranges (T1 and T2). The second vehicle V2 and a third vehicle V3 may call at the same IP range 54 and connection time intervals 52 but at different host ports 56 (D1 and D2 in FIG. 2). A fourth vehicle V4 may call in the same time range (T1 in FIG. 2) as the first vehicle V1 but at a different IP range 54 and APN range 60. A fifth vehicle V5 may call in the same time range (T2 in FIG. 2) as the second and third vehicles V2, V3 but at a different IP range 54 and APN range 60. Each of the vehicles V1 through V5 has a unique station identifier S (see FIG. 1).

Proceeding to block 116 of FIG. 3, the controller C is adapted to perform a clearance check or validity check. The clearance check may include confirming whether one of the automatic triggers has been sparked or set off. The clearance check may include verifying vehicle credentials or operational status.

If a system clearance is given (Block 116=YES), the method 100 proceeds to block 118. Per block 118 of FIG. 3, the controller C is adapted to activate or engage the internet protocol (IP) address ranges 54 and host ports 56 for the vehicle 12 and proceed with processing the request of the user 16. The internet protocol (IP) address ranges 54 and host ports 56 may be dynamically configured to remain disengaged unless given the system clearance. If not (Block 116=NO), the method 100 proceeds to block 120, where the controller C is adapted to purge the data that has already been transmitted and end the session.

From block 118, the method proceeds to block 122, where the controller C is adapted to selectively configure a new connectivity state for the vehicle 12. The new connectivity state may include activating a cellular registration of the vehicle 12. The new connectivity state may include changing settings of the automatic triggers, including changing their timings and switching them ON and OFF.

In summary, an effective and low-cost way to connect to a vehicle 12 is disclosed. The communication system 10 creates a periodic connectivity mode 14 that utilizes specific IP ranges, host ports, and connection time ranges to maximize the number of vehicles 12 that can make connections while minimizing resources. The communication system 10 retains an element of privacy by not actively connecting unless a system clearance is obtained. The benefit is that access is controlled, no data is transmitted, and privacy is maintained at the service provider. Additionally, data exchange is minimized upon initial connection which allows ending of accidental sessions prior to upload.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A communication system for a vehicle, comprising:
a controller adapted to selectively execute an alternative periodic connectivity mode for communication between a user of the vehicle and a remote assistance unit;
wherein the vehicle is not connected to a wireless plan;
wherein the controller has a processor and tangible, non-transitory memory on which instructions are recorded, the alternative periodic connectivity mode being activated based in part on at least one automatic trigger and/or a request from the user;
wherein the controller is adapted to assign a distinct identifier to the vehicle during execution of the alternative periodic connectivity mode; and
wherein the distinct identifier is defined by a plurality of parameters, including a connection time interval, an internet protocol address range and a host port.

2. The communication system of claim 1, wherein the internet protocol address range and the host port are dynamically configured to remain disengaged with the vehicle unless given a system clearance.

3. The communication system of claim 1, wherein the plurality of parameters includes an access point name range associated with a predetermined carrier.

4. The communication system of claim 3, wherein the access point name range is configured to toggle between an OFF mode and an ON mode.

5. The communication system of claim 1, wherein the at least one automatic trigger includes activation of at least one vehicle theft sensor.

6. The communication system of claim 1, wherein the at least one automatic trigger includes an internal vehicle diagnostic fault.

7. The communication system of claim 1, wherein the at least one automatic trigger includes expiration of a vehicle data credential.

8. The communication system of claim 1, wherein the controller is adapted to selectively configure a new connectivity state for the vehicle, including activating a cellular plan for the vehicle.

9. The communication system of claim 1, wherein the controller is adapted to selectively configure a new connectivity state for the vehicle, including changing settings of the at least one automatic trigger.

10. The communication system of claim 1, wherein the vehicle includes a telematics module, and the plurality of parameters includes a station identifier associated uniquely with the telematics module.

11. A method of operating a communication system for a vehicle having a controller with a processor and tangible, non-transitory memory on which instructions are recorded, the method comprising:
selectively executing an alternative periodic connectivity mode for communication between a user of the vehicle and a remote assistance unit, via the controller, the vehicle not being connected to a wireless plan;
activating the alternative periodic connectivity mode based in part on at least one automatic trigger and/or a request from the user, via the controller; and
assigning a distinct identifier to the vehicle during execution of the alternative periodic connectivity mode, via the controller, wherein the distinct identifier being defined by a plurality of parameters, including a connection time interval, an internet protocol address range and a host port.

12. The method of claim 11, further comprising:
adding an access point name range in the plurality of parameters, the access point name range being associated with a predetermined carrier, via the controller; and
selectively toggling the access point name range between an OFF mode and an ON mode, via the predetermined carrier.

13. The method of claim 11, further comprising:
embedding a telematics module in the vehicle; and
including a station identifier in the plurality of parameters, the station identifier being associated uniquely with the telematics module.

14. The method of claim 11, further comprising:
configuring the internet protocol address range and the host port to remain disengaged unless given a system clearance, via the controller.

15. The method of claim 11, further comprising:
incorporating activation of at least one vehicle theft sensor in the at least one automatic trigger.

16. The method of claim 15, further comprising:
incorporating an internal vehicle diagnostic fault in the at least one automatic trigger.

17. The method of claim 15, further comprising:
incorporating expiration of a vehicle data credential in the at least one automatic trigger.

18. The method of claim 11, further comprising:
selectively configuring a new connectivity state for the vehicle, including activating a cellular plan for the vehicle, via the controller.

19. A communication system for a vehicle, comprising:
a controller adapted to selectively execute an alternative periodic connectivity mode for communication between a user of the vehicle and a remote assistance unit, the vehicle having a disabled cellular registration;
wherein the controller has a processor and tangible, non-transitory memory on which instructions are recorded, the alternative periodic connectivity mode being activated based in part on at least one automatic trigger and/or a request from the user;
wherein the at least one automatic trigger includes activation of at least one vehicle theft sensor;
wherein the controller is adapted to assign a distinct identifier to the vehicle during execution of the alternative periodic connectivity mode;
wherein the distinct identifier is defined by a plurality of parameters, including a connection time interval, an internet protocol address range, a station identifier and a host port;
wherein the controller is adapted to select an access point name range for the vehicle, the access point name range being associated with a predetermined carrier and adapted to selectively toggle between an OFF mode and an ON mode; and
wherein the internet protocol address range and the host port are dynamically configured to remain disengaged unless given a system clearance.

20. The communication system of claim 19, wherein the at least one automatic trigger includes an internal vehicle diagnostic fault.

* * * * *